Dec. 26, 1950 H. L. BOWDITCH 2,536,000
REVERSIBLE AIR OPERATED MOTOR
Filed Dec. 26, 1947 2 Sheets-Sheet 1
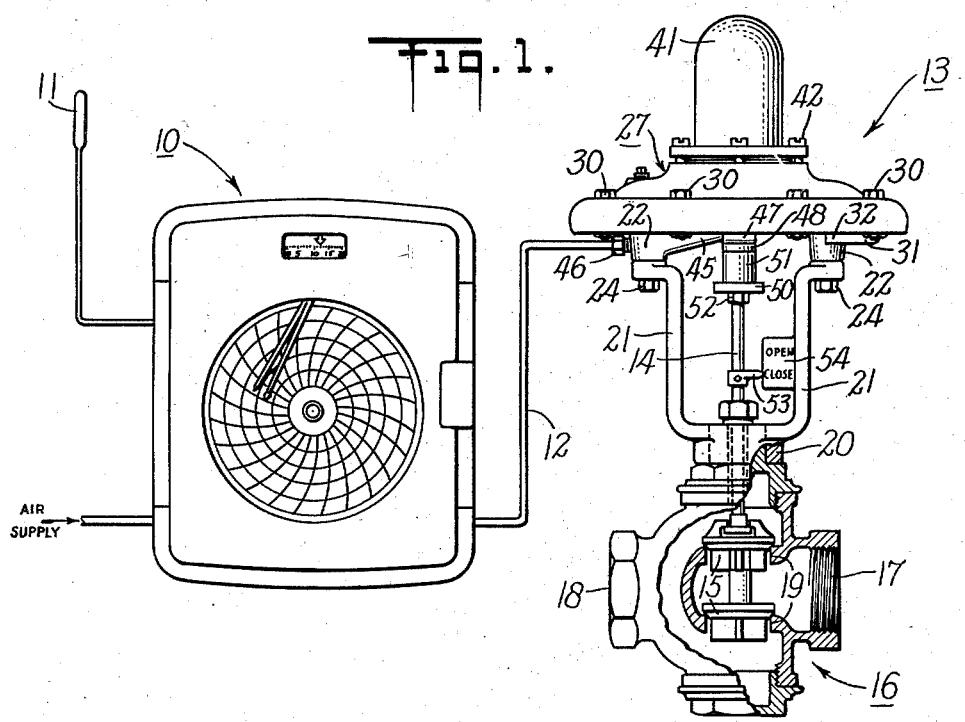
INVENTOR
Hoel L. Bowditch
BY
Blair, Curtis & Hayward
ATTORNEYS Dec. 26, 1950        H. L. BOWDITCH        2,536,000
REVERSIBLE AIR OPERATED MOTOR
Filed Dec. 26, 1947        2 Sheets-Sheet 2
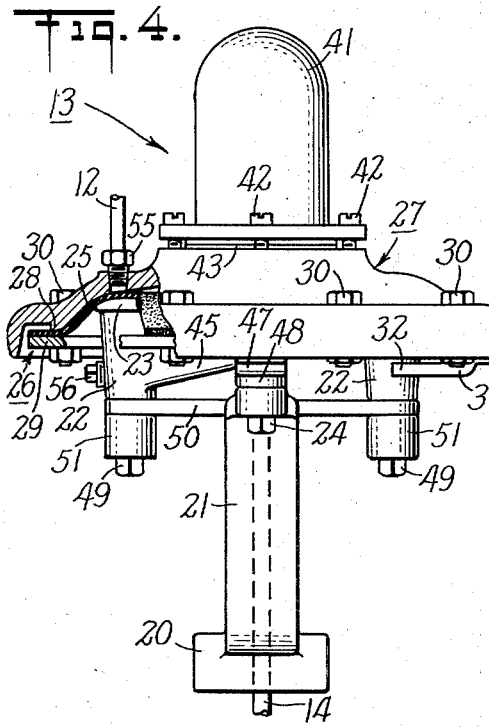
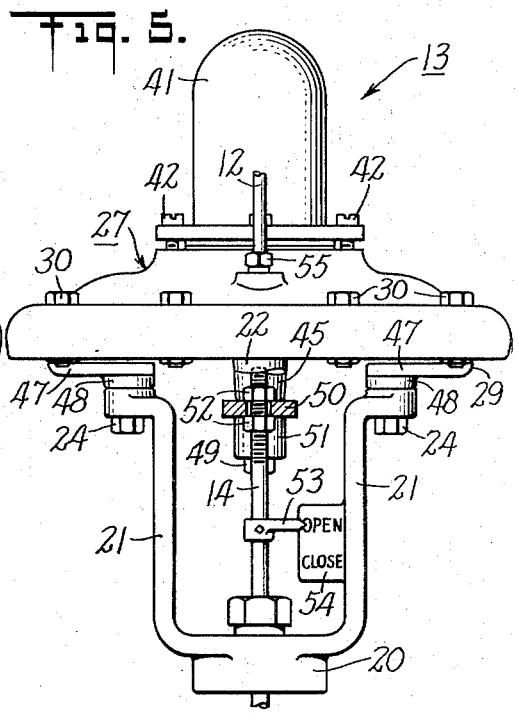
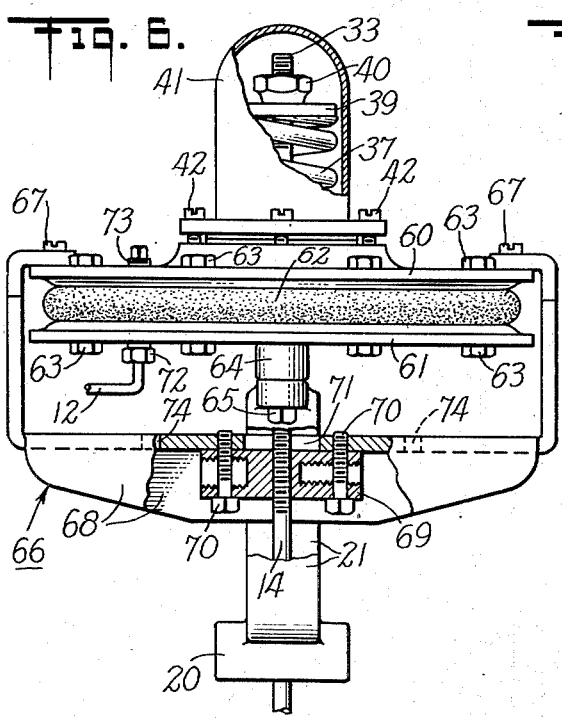
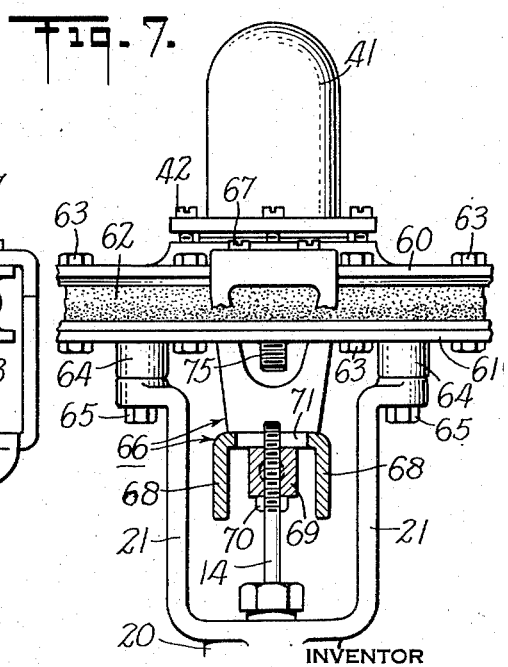
INVENTOR
Hoel L. Bowditch
BY
Blair, Curtis + Hayward
ATTORNEYS Patented Dec. 26, 1950

2,536,000

UNITED STATES PATENT OFFICE 2,536,000

REVERSIBLE AIR-OPERATED MOTOR

Hoel L. Bowditch, Jamaica Plain, Mass., assignor to Foxboro Company, Foxboro, Mass., a corporation of Massachusetts Application December 26, 1947, Serial No. 793,922

8 Claims. (Cl. 137—156)

This invention relates to pneumatically operated motors for positioning reciprocating valve-operating rods of conventional valves used in industry to regulate fluid flow.

The invention provides a novel motor which by a simple reversal of its parts may be caused either to open a valve with increasing air pressure supplied to the motor, or to close the same valve with increasing air pressure. Thus, the invention provides a reversible air-operated motor.

Need for a reversible motor has long existed unfulfilled by a commercially practical motor until the present invention. Industrial processes are to a large extent controlled automatically by pneumatically-operated controllers. Each such controller, in response to a process variable such as temperature, pressure, flow, etc., produces a control output air pressure which control pressure in turn operates on a motor to cause the motor to move a valve, controlling flow that affects the process variable, to maintain it at desired values or in proper balance with other variables. The motor includes operating members, urged together by a spring, and forced apart by air pressure against the action of the spring. Relative movement of the operating members moves a reciprocating valve-operating rod. The valve-operating rod is either a valve stem which moves a valve directly connected to it, or by suitable linkage is connected to turn a butterfly valve.

In many valve installations it is important, when no air pressure is supplied to the motor, that the spring of the motor move the valve-operating rod to hold the valve closed, and that increasing air pressure move the valve-operating rod to open the valve. In other installations it is equally important, when no air pressure is supplied, that the spring move the valve-operating rod or valve stem to hold the valve open. The need of such oppositely-acting valve motors originates sometimes from safety requirements and sometimes from convenience requirements.

A common example of safety requirements concerns air pressure failure such as occurs with compressor failure or with air-line breakage. In cases where a motor operates a valve controlling fuel flow or other heating media, the motor should close the valve in the event of air failure. But if the valve is regulating cooling water cooling an explosive material or an explosive process, then in the event of air pressure failure, the motor should move the valve to open position, and hold it open.

Convenience requirements are generally concerned with starting up an industrial process. These are instances in which before a process is started and is on automatic control, it is important for certain valves to be held open by their motors and for other valves to be held closed by their motors.

In the past these safety and convenience requirements have been met in several ways. Valve manufacturers have supplied valves which may be reversed, i. e., turned end for end so that in one condition of operation, downward movement of the valve stem by the motor opens the valve ports; and in a reversed condition of operation, the same downward movement of the valve stem closes the valve ports. But this solution is not entirely satisfactory because reversible valves are more expensive than valves having no reversible feature. Also many types of widely used valves are not made reversible. When valves were used that could not be reversed, it was necessary for the instrument manufacturer and the instrument user to stock two types of valves, i. e., one that opened with downward valve stem movement, and one that closed with downward valve stem movement. Or the manufacturer and user would stock two types of motors, one which moved the valve stem downwardly with increasing pressure, and one which moved the valve stem upwardly with increasing pressure. It was common for users and manufacturers to stock either both types of valves or both types of motors. Otherwise, it was impossible to meet the requirements of having increasing air pressure open valves in some instances, and increasing air pressure close valves in other instances.

The present invention solves this problem and eliminates need for reversible valves and for stocking both air-to-raise and air-to-lower valves, and for stocking both air-to-raise and air-to-lower motors. The invention provides an air-operated motor which is readily reversible and may be set up either to move the valve stem downwardly with increasing air pressure or to move the valve stem upwardly with increasing air pressure.

It is an object of the present invention to provide a novel air-operated motor that is readily reversible and which may be set up either to move its valve stem downwardly with increasing air pressure, or to move its valve stem upwardly with increasing air pressure.

In the drawings:

Figure 1 shows a conventional controller connected to supply air to a conventional so-called diaphragm air-operated motor embodying the invention, and arranged so that increasing air pressure moves the valve stem upwardly to open a conventional valve shown partly in section;

Figure 2 shows enlarged and in section the diaphragm motor of Figure 1;

Figure 3 is a side elevation of the motor of Figure 2 looking from the left in Figure 2 and showing parts broken away;

Figure 4 is a front elevation with parts broken away of the motor of Figure 2 but reversed so that increasing air pressure moves the valve stem downwardly;

Figure 5 is a side elevation of the motor of Figure 4 with parts broken away to show the connection between the valve stem and motor;

Figure 6 is a front elevation with parts broken away of another type of air-operated motor embodying the invention; and Figure 7 is a side elevation of the motor of Figure 6 and also showing parts broken away.

Corresponding reference characters indicate corresponding parts throughout the several views of the drawings.

Referring to Figure 1, a conventional controller generally indicated at 10, in response to variations in a thermometer bulb 11, supplies a variable air pressure through pipe 12 to a diaphragm motor generally indicated at 13. Motor 13 has a valve-operating rod in the form of a valve stem 14, which operates a valve head 15 of a conventional valve generally indicated at 16. Valve 16 has an inlet 17, an outlet 18, and ports 19 whose openings are controlled by valve head 15. As will appear, the motor in Figures 1–3 is so set up that when no air pressure is supplied to motor 13, it holds valve stem 14 down, and holds valve head 15 closed against the seats of ports 19. Variation of air pressure supplied to the motor causes it to move valve head 15 upwardly to different positions and to regulate the flow passed by valve 16, which in turn affects the temperature being measured by bulb 11.

The diaphragm motor 13 as set up is an air-to-raise motor, operating a valve that opens as the motor raises the valve stem. With this set up increasing air pressure opens the valve. Such a motor is used when valve 16 is controlling fuel flow to a furnace whose temperature is measured by bulb 11. If the air pressure supply fails, the motor closes valve 16, cutting off fuel flow and preventing damage due to over heating.

The diaphragm motor is conventionally supported from valve 16 by a collar 20 fixed to the valve and a yoke whose rigid supporting legs 21 extend upwardly from collar 20. Referring to Figure 2, the upper ends of legs 21 support legs 22 (also referred to herein as supporting brackets) extending down from circular diaphragm plate 23 forming the lower operating member. Bolts 24 pass through holes in legs 21, and thread into and secure legs 22 to the yoke and to valve 16.

Resting on plate 23 is a non-metallic impervious circular flexible diaphragm 25, whose edge extends beyond plate 23 and is clamped as at 26 to the outer portion of an inverted cup-shaped circular hood generally indicated at 27 (Figure 1) and forming the upper operating member. To facilitate tight clamping of the diaphragm, hood 27 is recessed around its edge to provide annular shoulder 28. An annular ring 29 is held tight against the underside of diaphragm 25, and clamps it between the shoulder 28. Bolts 30 pass through ring 29, through diaphragm 25, and through hood 27 beyond shoulder 28 and hold the ring, diaphragm, and hood tightly clamped together.

Ring 29 (Figure 2) carries extension 31 which extends inwardly from the ring and terminates in a yoke-shaped end 32 which straddles one of the legs 22 and keeps hood 27 from turning with respect to plate 23.

Extending upwardly from plate 23 is a hollow tube 33 which performs two functions, one to conduct air pressure to the closure formed by the diaphragm and hood, and the other to provide the mechanical connection between plate 23 and a coil spring 37. Tube 33 is threaded into plate 23, and extends upwardly through a hole in diaphragm 25 and through a hole 36 in hood 27. A nut 34 and a washer 35 clamp the diaphragm against plate 23, to prevent air pressure from escaping past the hole in the diaphragm where tube 33 passes therethrough. Compression spring 37 surrounds tube 33, pushes upwardly on a washer 39 held in place on tube 33 by adjustable nut 40, and pushes down against recessed surface 38 provided on top of movable hood 27.

Over spring 37 and tube 33 is a closing cap or bonnet 41 fixed to hood 27 by bolts 42. Gasket 43 provides a tight seal so that the closure formed by diaphragm 25, hood 27 and bonnet 41 is airtight, except for the entrance through tube 33.

Spring 37 thus provides a force always pushing downwardly on hood 27, and air pressure in the closure provides a force that pushes upwardly on hood 27 against spring pressure, thereby to lift the hood and compress the spring. By adjusting nut 40 the initial compression of the spring is adjusted, and the amount of the initial air pressure in the closure required to lift hood 27 from plate 23 (i. e., relatively to move hood 27 and plate 23) is adjusted. It is customary to adjust nut 40 so that three pounds per square inch pressure is required before the hood and plate commence to separate against the force of the spring.

The control air pressure is conducted to the closure through tube 33. To this end, tube 33 threads into the outlet of a passage 44 formed within a ridge 45 cast on the underside of plate 23. Ridge 45 at its outer end becomes part of one of the legs 22. Passage 44 is threaded at its inlet to receive a nipple 46 which serves to connect control pressure conducting pipe 12 with passage 44, and so with tube 33 and the inside of the above-defined closure.

With the motor constructed as described, when no air pressure from line 12 is supplied to the closure, spring 37 pressing downwardly on hood 27, holds it as close to plate 23 as the construction permits. But increasing air pressure in the closure, pushes upwardly against movable hood 27 (the upper operating member), and downwardly against diaphragm 25 and rigidly held plate 23 (the lower operating member) supported by yoke 21; and when the upward force overcomes the downward compression force of spring 37, hood 27 rises. The amount hood 27 rises depends upon the pressure within the closure, and the amount spring 37 must be compressed to balance the upward force exerted by the air pressure. As the hood 27 moves up, diaphragm 25 flexes and does not resist the upward movement. Guide yoke 31 prevents the hood 27 from rotating with respect to the fixed plate 23.

Movement of hood 27 by the air pressure and by spring 37 is transmitted to valve stem 14 and valve head 15 by the following mechanical connection: Referring to Figure 3, ring 29 is provided with two inwardly-projecting and downwardly-extending oppositely-disposed brackets 47 suitably fixed as by welding to the underside of the ring. Each bracket has a downwardly extending collar 48, the collar and bracket being threaded to receive bolts 49. Bolts 49 secure an adaptor in the form of a strap 50 to brackets 47, spacing sleeves 51 being interposed to space the strap downwardly from the brackets. As shown in Figure 2, strap 50 has a hole through its center to receive the threaded upper end of valve stem 14, and upper and lower clamping nuts 52 hold valve stem 14 in proper adjusted relationship to strap 50. With this connection, vertical movement of hood 27 is transmitted to valve stem 14 and to valve head 15. As shown in Figures 1 and 2, a pointer 53 is suitably secured to valve stem 14 and, by reference to a stationary index 54 secured to yoke 21, indicates the position of valve head 15.

Valve stem 14 is so adjusted with respect to strap 50 that when less than the initial three pounds per square inch air pressure is supplied to the closure, spring 37 pushes hood 27 downwardly and holds valve head 15 tightly closed against the valve seats of ports 19.

With this arrangement of the parts of diaphragm motor 13, air failure permits spring 37 to close valve 16.

For reasons that will be immediately pointed out, brackets 47 and legs 22 are angularly spaced equidistant from each other and are radially equidistant from valve-operating rod 14.

Referring now to Figures 4 and 5, parts of diaphragm motor 13 are shown reversed so that increasing air pressure in the closure now moves valve stem 14 downwardly and moves the now normally open valve 16 to closed position. In other words, air failure now permits spring 37 to move valve 16 fully open and to hold it open. To this end, legs 21 of the yoke supported from collar 20 are now secured to and support hood 27, so that hood 27 is held rigid and plate 23 free to move. To accomplish this change, bolts 24 (Figure 2) and bolts 49 (Figure 3) are removed and hood 27, diaphragm 25 and plate 23 are rotated as a unit through 90° to align brackets 47 of ring 29 with yoke legs 21, whereupon bolts 24 are inserted to secure ring 29 to the yoke. Thus, hood 27 is now rigidly supported from valve 16.

Strap 50 is also rotated through 90° to align it with legs 22, and bolts 49 are threaded into legs 22 to connect strap 50 to plate 23. Spacing sleeves 51 are not used to space strap 50 from legs 22, but merely used as washers for bolts 49. This shift of brackets 47 to legs 21 is made possible by the above mentioned equidistant spacing of brackets 47 and legs 22.

Referring to Figure 5, nuts 52 are threaded downwardly on valve stem 14 to raise valve stem 14, and valve head 15, with respect to strap 50, and with respect to plate 23 so that when plate 23 is pulled up to hood 27 by spring 37, valve head 15 is moved to fully open position.

With this arrangement when no air pressure is in the closure, spring 37 pushes upwardly on tube 33 and so pulls plate 23, valve stem 14 and valve head 15 upwardly to hold valve 16 wide open. But increasing pressure in the closure above the initial three pounds per square inch pushes down on plate 23 compressing spring 37, and moves valve stem 14 and valve head 15 downwardly to close valve 16. Thus, increasing pressure now moves valve stem 14 downwardly, whereas in the Figure 2 construction increasing pressure moved valve stem 14 upwardly.

When motor 13 is thus reversed, strap 50 holds valve stem 14 in its uppermost position when no air pressure is in the closure, i. e., when plate 23 and hood 27 are closest together. To accomplish this, the length of legs 22, the length of spacing collars 51, and the amount that brackets 47 are made to extend downwardly from the hood 27 are so selected that when the hood is rotated 90° from its Figure 2 position to its Figure 4 position although hood 27 actually lowers when brackets 47 are bolted to yoke legs 21, strap 50 is actually raised because spacing sleeves 51 are no longer effective. In addition to raising strap 50 valve stem 14 is effectively shortened by threading nuts 52 downwardly on it. These two actions, the raising of strap 50 and the shortening of valve stem 14, raise valve head 15 upwardly completely to open the valve when plate 23 rests on hood 27 as indicated by pointer 53 in Figure 5.

In the Figures 4 and 5 construction, since hood 27 is stationary and plate 23 is movable, the connection with the air pressure pipe 12 and the diaphragm motor is made through nipple 55 threaded into the top of hood 27, and passage 44 is closed by a suitable plug 56.

Referring to Figures 6 and 7, the invention is shown applied to a different type of motor. In this motor the upper and lower operating members comprise upper and lower plates 60 and 61, which plates are connected by a flexible corrugated annular rubber cylinder 62 whose ends are suitably secured to the upper and lower plates by bolts 63 and by internal annular clamping rings not shown. As in Figure 2, a rod 33 (not hollow) extends upwardly from plate 61 through a hole in plate 62 and carries a washer 39 which presses on a compression spring 37 which pushes upwardly on the rod and downwardly on plate 61. The spring and rod are covered by closing bonnet 41.

As in the Figure 2 diaphragm motor, spring 37 urges plates 60 and 61 toward each other, and increasing pressure separates them against the action of spring 37. In the arrangement shown in Figures 6 and 7, lower plate 61 is supported from yoke legs 21 by posts (brackets) 64 secured to and extending down from the underside of plate 61, and threaded to receive bolts 65. Movement of upper plate 60 is transmitted to valve stem 14 by a U-bracket 66 which spans plates 60 and 61, passes below plate 61, and which is secured to plate 60 by bolts 67.

Bracket 66 passes far enough below plate 61 to permit the necessary relative movement of plates 60 and 61. Bracket 66 is reinforced by flanges 68 and between the flanges and adaptor in the form of block 69 is bolted to the bracket by bolts 70. Block 69 spans an opening 71 through bracket 66, and has a hole threaded to receive valve stem 14 extending upwardly through opening 71. In this manner, valve stem 14 is carried upwardly when increasing pressure causes the plates to separate against the spring action, and is moved downwardly when decreasing pressure permits the plates to move together. A nipple 72 in plate 61 serves to connect air supply pipe 12 with the interior of the motor. Nipple 73 in the top plate is closed by a plug.

To reverse the action of the motor, bolts 65 are withdrawn and adaptor block 69 is unbolted from bracket 66, and stem 14 is threaded out of the block. Yoke legs 21 are then bolted to bracket 66 by threading bolts 65 into threaded holes 74 in bracket 66. Block 69 is turned on end and passed through hole 71 and, its upper end which is tapped, is threaded onto a post 75 fixed to and extending downwardly from the center of plate 61. Then valve stem 14 is threaded into the lower end of block 69 which is tapped to receive it. Thus plate 60 is now rigidly supported, and plate 61 is free to move. Spring 37 normally holds plate 61 raised, but increasing air pressure lowers plate 61 and moves valve stem 14 downwardly.

As in the Figure 2 construction, when the motor is reversed, the air connection is shifted to the stationary part so that flexing of piping is avoided.

The block 69 serves as an adaptor both to make the connection of the valve stem either to bracket 66 or to plate 61, and to provide the effective change of length of valve stem 14, when the motor is reversed, to change the position of valve head 15.

Since many embodiments might be made of the present invention and since many changes might be made in the embodiment disclosed herein, it is to be understood that the foregoing description is to be interpreted as illustrative only and not in a limiting sense.

I claim:

1. In a pneumatic motor for reciprocating a valve-operating rod and having two opposing inflexible operating members joined to each other by a flexible closure member forming therewith a closed chamber, said operating members being spring-urged together and being separable along the axis of reciprocation against the spring action by increasing air pressure within the chamber, in combination, at least two fixed supporting members, a first set of supporting brackets fixed to one operating member and spaced equidistant from the axis of the valve-operating rod and mountable on said supporting member, a second set of supporting brackets on the other operating member and spaced equidistant from said valve-operating rod and from said first set of supporting brackets and being mountable on said supporting members, whereby either of said operating members may be rigidly mounted on said supporting members leaving the other operating member free to move, an air supply connection through at least one of said operating members into said closed chamber through which air may be supplied to or withdrawn from said chamber to operate said motor, an adaptor connectible to either of said operating members and to said valve-operating rod, whereby said valve-operating rod may be secured to and moved by the operating member not mounted on said supporting members so that when the operating member nearest said valve-operating rod is mounted on said supporting members, increasing air pressure in said closed chamber moves the other operating member and pulls the valve-operating rod toward the fixed operating member, and when the operating member farthest from the valve-operating rod is mounted on said supporting members, increasing air pressure in said closed chamber moves the other operating member and pushes the valve-operating rod away from the fixed operating member.

2. In a pneumatic motor for reciprocating a valve-operating rod and having first and second operating members joined by a flexible diaphragm that forms a closed chamber with the first operating member, and compression coil spring means adapted to urge said operating members together and acting against variable air pressure supplied to said closed chamber which moves said operating members apart, in combination, mechanism for rigidly mounting either of said operating members and for attaching the other operating member to said valve-operating rod whereby the motor may be mounted so that increasing air pressure either moves said first operating member and valve-operating rod in one direction or moves the second operating member and valve-operating rod in the opposite direction, said mechanism comprising, a rigid support having at least two supporting members, at least two supporting brackets mounted on said first operating member equidistant from said valve-operating rod and mountable on said supporting members, at least two supporting brackets mounted on said second operating member equidistant from said valve-operating rod and from the supporting brackets on said first operating member and mountable on said supporting members, whereby by rotating said operating members as a unit either operating member may be rigidly mounted on said supporting members, an air supply connection through at least one of said operating members into said closed chamber through which air may be supplied to or withdrawn from said chamber to operate said motor, an adaptor shaped to extend between and be mounted on either of said sets of supporting brackets, and a part on said adaptor for connecting said valve-operating rod to said adaptor, whereby the operating member not mounted on said supporting members may be connected through said adaptor to move said valve-operating rod.

3. In a pneumatic motor for reciprocating a valve-operating rod and having first and second operating members joined by a flexible diaphragm that forms a closed chamber with the first operating member, and compression coil spring means adapted to urge said operating members together and acting against variable air pressure supplied to said closed chamber which moves said operating members apart, in combination, mechanism for rigidly mounting either of said operating members and for attaching the other operating member to said valve-operating rod whereby the motor may be mounted so that increasing air pressure either moves said first operating member and valve-operating rod in one direction or moves the second operating member and valve-operating rod in the other direction, said mechanism comprising, a rigid support having at least two supporting members, a set of supporting brackets mounted on said first operating member equidistant from said valve-operating rod and mountable on said supporting members, a set of supporting brackets mounted on said second operating member equidistant from said valve-operating rod and from the supporting brackets on said first operating member and mountable on said supporting members, whereby by rotating said operating members as a unit either operating member may be rigidly mounted on said supporting members, an air supply connection through at least one of said operating members through which air may be supplied to and withdrawn from said closed chamber to operate said motor, an adaptor shaped to extend between and be mounted on either of said sets of supporting brackets, and a part on said adaptor for connecting said valve-operating rod to said adaptor, whereby the operating member not mounted on said supporting members may be connected through said adaptor to move said valve-operating rod, and a guiding yoke extending from one of said operating members and straddling a bracket extending from the other operating member to prevent relative rotation between the upper and lower operating members.

4. In a pneumatic motor for reciprocating a valve-operating rod and having first and second operating members joined by a flexible diaphragm that forms a closed chamber with the first operating member, and compression coil spring means adapted to urge said operating members together and acting against variable air pressure supplied to said closed chamber which moves said operating members apart, in combination, mechanism for rigidly mounting either of said operating members and for attaching the other operating member to said valve-operating rod whereby the motor may be mounted so that increasing air pressure either moves said first operating member and valve-operating rod in one direction or moves the second operating member and valve-operating rod in the other direction, said mechanism comprising, a rigid support having at least two supporting members, a set of supporting brackets mounted on said upper operating member equidistant from said valve-operating rod and mountable on said supporting members, a set of supporting brackets mounted on said second operating member equidistant from said valve-operating rod and from the supporting brackets on said first operating member and mountable on said supporting members, whereby by rotating said operating members as a unit either operating member may be rigidly mounted on said supporting members, an air supply connection through at least one of said operating members through which air may be supplied to or withdrawn from said closed chamber to operate said motor, an adaptor shaped to extend between and be mounted on either of said sets of supporting brackets, and a part on said adaptor for connecting said valve-operating rod to said adaptor, whereby the operating member not mounted on said supporting members may be connected through said adaptor to move said valve-operating rod, and a guiding yoke extending from said upper operating member and straddling a bracket extending from the lower operating member to prevent relative rotation between the upper and lower operating members.

5. In a pneumatic motor for reciprocating a valve-operating rod and having upper and lower operating members joined by a flexible diaphragm that forms a closed chamber with the upper operating member, and compression coil spring means adapted to urge said operating members together and acting against variable air pressure supplied to said closed chamber which moves said operating members apart, in combination, mechanism for rigidly mounting either of said operating members and for attaching the other operating member to said valve-operating rod whereby the motor may be mounted so that increasing air pressure either moves said upper operating member to move said valve-operating rod toward said lower operating member or moves the lower operating member to move said valve-operating rod away from said upper operating member, said mechanism comprising, a rigid support having at least two supporting members, a set of downwardly-extending supporting brackets mounted on said upper operating member equidistant from said valve-operating rod and mountable on said supporting members, a set of downwardly-extending supporting brackets mounted on said lower operating member equidistant from said valve-operating rod and from the supporting brackets on said upper operating member and mountable on said supporting members, whereby by rotating said operating members as a unit either operating member may be rigidly mounted on said supporting members, an air supply connection through each of said operating members into said closed chamber and a plug member closing the air supply connection of the movably mounted operating member whereby the air pressure may always be supplied through the rigidly mounted operating member and an adaptor shaped to extend between and be mounted on either of said sets of supporting brackets, and a part on said adaptor for connecting said valve-operating rod to said adaptor, whereby the operating member not mounted on said supporting members may be connected through said adaptor to move said valve-operating rod, a hollow tube extending upwardly from the center of said lower operating member through said diaphragm and into the interior of said upper operating member, a reaction part on said tube against which said compression spring pushes, a reaction part on said upper operating member located below the reaction part on said tube and against which said compression spring passes, whereby force of said compression spring urges said operating members together, and a passage in said lower operating member connecting with said tube and forming therewith the air supply connection through the lower operating member to supply air pressure to the closed chamber to force said operating members apart against the action of said compression spring.

6. In a pneumatic motor for reciprocating a valve-operating rod and having upper and lower operating plates joined by a flexible corrugated cylindrically-shaped bellows that forms a closed chamber with the upper and lower plates, and compression coil spring means within said chamber adapted to urge said plates together against air pressure supplied to said chamber, in combination, mechanism for rigidly mounting either of said operating plates and for connecting the other plate to said valve-operating rod comprising, a rigid support having at least two supporting members, a first bracket extending downwardly from said upper plate and extending beneath said lower plate and adapted to be mounted on said supporting members, a set of downwardly-extending supporting brackets mounted on said lower plate equidistant from said first bracket and adapted to be mounted on said supporting members, whereby either operating plate may be rigidly mounted on said supporting members, an adaptor connectible to said first bracket and to said valve-operating rod when said set of supporting brackets mount said lower operating plate on the supporting members, and being connectible to said lower operating plate and to said valve-operating rod when said first bracket mounts said upper operating plate on said supporting members, an air supply connection through each of said operating plates into said closed chamber and a plug member for closing the air supply connection of the movable mounted plate whereby the air pressure may always be supplied through the rigidly mounted plate, and an opening in said first bracket through which said adaptor passes when connecting said valve-operating rod and said lower plate.

7. In a pneumatic motor for reciprocating a valve-operating rod and having upper and lower operating members joined by a flexible diaphragm that forms a closed chamber with the upper operating member, and compression coil spring means adapted to urge said operating members together and acting against variable air pressure supplied to said chamber which moves said operating members apart, in combination, mechanism for rigidly mounting either of said operating members and for attaching the other operating member to said valve-operating rod whereby the motor may be mounted so that increasing air pressure either moves said upper operating member to move said valve-operating rod toward said lower operating member or moves the lower operating member to move said valve-operating rod away from said upper operating member, an air supply connection through each of said operating members into said chamber, and a plug member for closing the air supply connection of the operating member movably mounted, whereby the air pressure may always be supplied through the rigidly mounted operating member.

8. In a pneumatic motor for reciprocating a valve-operating rod and having upper and lower operating members joined by a flexible diaphragm that forms a closed chamber with the upper operating member, and compression coil spring means adapted to urge said operating members together and acting against variable air pressure supplied to said chamber which moves said operating members apart, in combination, mechanism for rigidly mounting either of said operating members and for attaching the other operating member to said valve-operating rod whereby the motor may be mounted so that increasing air pressure either moves said upper operating member to move said valve-operating rod toward said lower operating member or moves the lower operating member to move said valve-operating rod away from said upper operating member, said mechanism comprising, a rigid support having at least two supporting members, at least two downwardly extending supporting brackets mounted on said upper operating member and mountable on said supporting members, at least two downwardly-extending supporting brackets mounted on said lower operating member and mountable on said supporting members, whereby by rotating said operating members as a unit either operating member may be rigidly mounted on said supporting members, an air supply connection through each of said operating members into said closed chamber and a plug member for closing the air supply connection of the movably mounted operating member whereby air under pressure may always be supplied through the rigidly mounted operating member, an adaptor shaped to extend between and be mounted on either of said sets of supporting brackets, and a part on said adaptor for connecting said valve-operating rod to said adaptor, whereby the operating member not mounted on said supporting members may be connected through said adaptor to move said valve-operating rod.

HOEL L. BOWDITCH.

REFERENCES CITED

The following references are of record in the file of this patent:

UNITED STATES PATENTS

| Number | Name | Date |
|---|---|---|
| 1,841,901 | Mabey | June 19, 1932 |
| 2,208,539 | Brown | July 16, 1940 |
| 2,213,785 | Larson | Sept. 3, 1940 |